(12) United States Patent
Mixer

(10) Patent No.: US 6,561,532 B2
(45) Date of Patent: May 13, 2003

(54) BICYCLE SIDE CAR

(76) Inventor: John W. Mixer, 4137 Vernal Cir., Colorado Springs, CO (US) 80916-5505

( * ) Notice: Subject to any disclaimer, the term of this patent is extended or adjusted under 35 U.S.C. 154(b) by 0 days.

(21) Appl. No.: 10/008,145

(22) Filed: Nov. 8, 2001

(65) Prior Publication Data

US 2002/0074763 A1 Jun. 20, 2002

Related U.S. Application Data

(60) Provisional application No. 60/252,826, filed on Nov. 22, 2000.

(51) Int. Cl.⁷ ............................................... B62K 27/00
(52) U.S. Cl. ...................................... 280/203; 280/231
(58) Field of Search ................................ 280/203, 204, 280/230, 231

(56) References Cited

U.S. PATENT DOCUMENTS

| 1,170,148 A | | 2/1916 | Grogan | |
| 1,220,247 A | * | 3/1917 | Lydamore et al. | 280/12.1 |
| 1,848,451 A | * | 3/1932 | Wishart | 280/203 |
| 2,822,879 A | | 2/1958 | Overton | 180/11 |
| 3,595,600 A | | 7/1971 | Stevens | 280/203 |
| 3,704,899 A | | 12/1972 | Clem, II | 280/203 |
| 4,229,018 A | * | 10/1980 | Chika | 280/203 |
| 4,834,410 A | | 5/1989 | Parker | 280/209 |
| 5,292,142 A | * | 3/1994 | Vitarelli | 280/203 |
| 5,511,809 A | | 4/1996 | Sagi | 280/209 |

FOREIGN PATENT DOCUMENTS

| DE | 2970063 U | * | 3/1997 |
| FR | 2761333 A | * | 10/1998 |
| RU | 2161577 | * | 1/2001 |

* cited by examiner

Primary Examiner—Kevin Hurley
(74) Attorney, Agent, or Firm—Law Office of Dale B. Halling, LLC

(57) ABSTRACT

A bicycle sidecar includes a frame. A protective skin covers the frame. A wheel is connected to the frame. A connector system is used to attach the frame to a bicycle. A seat is and a grab bar are connected to the frame. A pedal assembly is mounted to the frame. A transmission system is connected to the pedal assembly. A pedal adapter assembly connects the transmission system to the bicycle.

6 Claims, 6 Drawing Sheets

BICYCLE SIDE CAR

RELATED APPLICATIONS

This application is entitled to the benefit of Provisional Patent Application Ser. No. 60/252,826 filed Nov. 22, 2000, entitled "Bisicar" and having the same inventor as the present application.

FIELD OF THE INVENTION

This invention relates to bicycles and more particularly to a sidecar for a bicycle.

BACKGROUND OF THE INVENTION

There have been a number of attempts to allow two or more people to share a bicycle ride. Tandem bikes have two riders in a line. This does allow both people to share a bicycle but requires coordination between the riders, makes the bicycle fairly long and does not allow easy communication between the riders. Another solution has been to add a wheeled chair behind the bicycle. This is used as a human taxi in some parts of the world. However, this makes communication between the riders difficult and adds to the effort required by the bicycle rider since he is the only one pedaling the bicycle. Sidecars have been added to a bicycle similar to motorcycle sidecars. This does not require any coordination between the riders and provides some cargo space. Unfortunately, the rider in the sidecar is dead weight for the rider pedaling the bicycle.

Thus there exists a need for a bicycle sidecar that overcomes these and other problems.

DETAILED DESCRIPTION

A bicycle sidecar includes a frame. A protective skin covers the frame. A wheel is connected to the frame. A connector system is used to attach the frame to a bicycle. A seat is and a grab bar are connected to the frame. A pedal assembly is mounted to the frame. A transmission system is connected to the pedal assembly. A pedal adapter assembly connects the transmission system to the bicycle.

Figure 1:
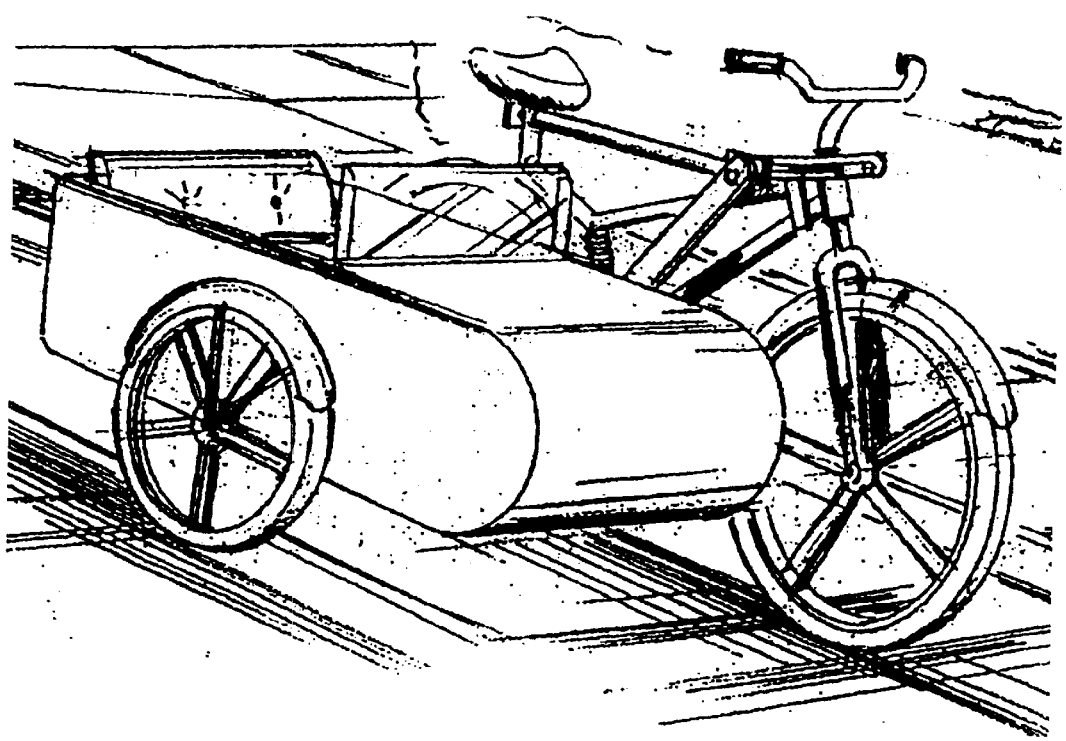
FIG. 1 is a perspective view of a bicycle sidecar attached to a bicycle in accordance with one embodiment of the invention.

FIG. 1 shows a perspective view in accordance with one embodiment of the invention depicting the general placement of the sidecar relative to a bicycle. It could be placed on either the left or right side of the bicycle and could have more or less comfort accessories. The sidecar has a protective outer skin made of some type of reinforced plastic. It covers left and right sides, the bottom, back, front and a portion of the top of the sidecar frame creating an open seating compartment and a protected petal compartment. The skin may be made from another material such as metal or canvas and may come in a variety of colors.

Figure 2:
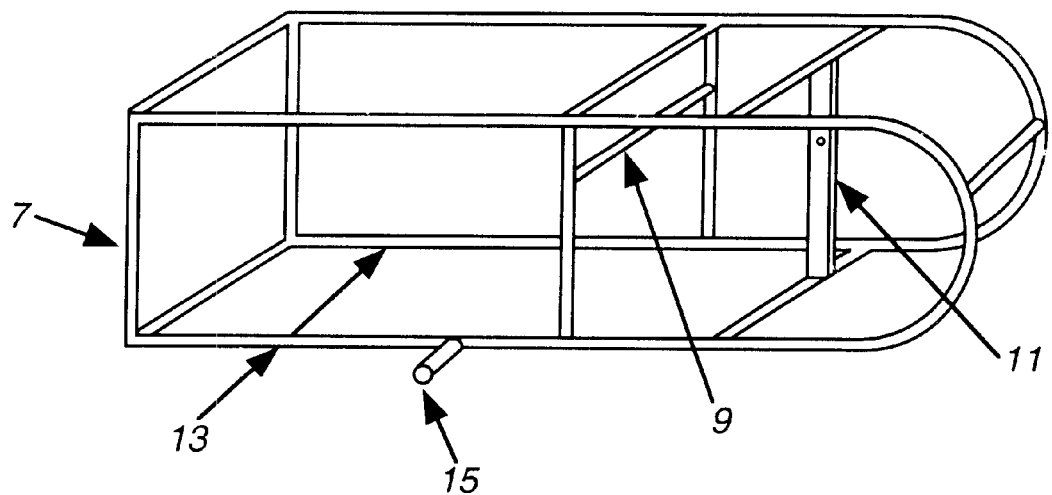
FIG. 2 is a perspective view of the sidecar frame in accordance with one embodiment of the invention.

The frame of the sidecar shown in FIG. 2 may be a metal frame 7. All metal parts could have corrosion protection or be made of a corrosion resistant metal. The grab bar 9 is a round metal rod or tube securely attached to the frame forward of the seat to provide a hand hold when adjusting the seat or when assisting in pedaling. The vertical support 11 is for the installation of the pedal assembly. The seat track 13 is along both sides of the frame bottom and provides a channel for adjusting the seat for comfort and pedaling efficiency. There is a stub axle 15 for installing a bicycle type wheel. In one embodiment a sled runner may be attached to the stub axle 15 for use in snow. In one embodiment, the frame and the protective skin are formed out of a single piece of material such as metal or sturdy plastic.

Figure 3:
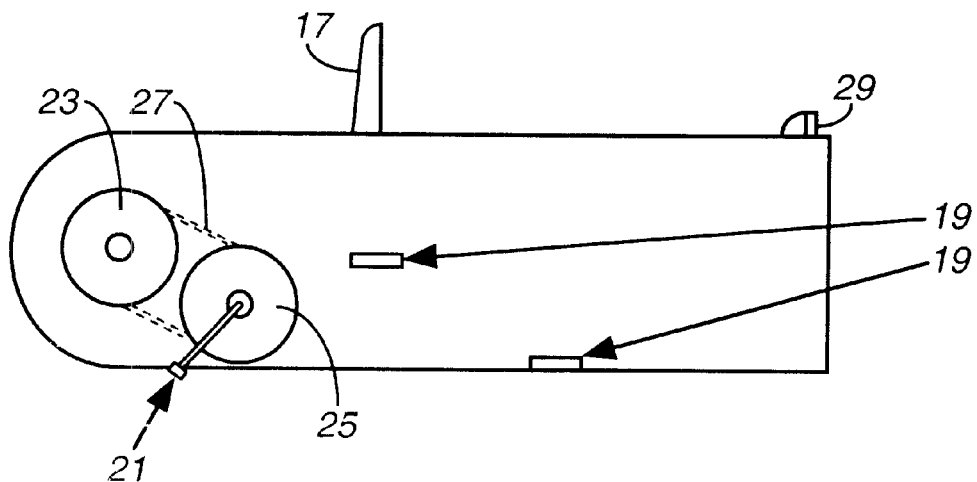
FIG. 3 is a side view of the bicycle sidecar showing placement of the transmission assembly in accordance with one embodiment of the invention.

FIG. 3 is a side view of the bicycle sidecar showing placement of the transmission assembly in accordance with one embodiment of the invention. In one embodiment a windshield 17 and steps 19 may be added. The transmission system 21 mounts on the exterior of the sidecar. The transmission system 21 consists of a first sprocket (top sprocket) 23 connected to a second sprocket (bottom sprocket) 25 connected by a chain 27. The top sprocket 23 connects to a pedal assembly (shown in FIG. 4) in the bicycle sidecar. The bottom sprocket 25 connects to a pedal adapter assemble (see FIG. 5). A seat 29 is also shown in the figure.

Figure 4:
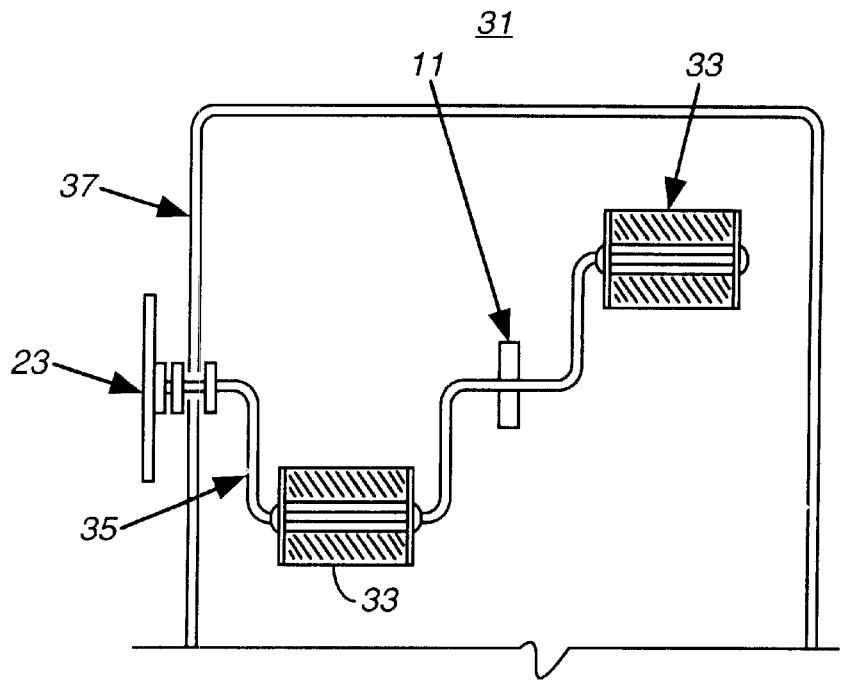
FIG. 4 is a top view of the pedal assembly in accordance with one embodiment of the invention.

FIG. 4 is a top view of the pedal assembly 31 in accordance with one embodiment of the invention. The pedal assembly 31 has two pedals (pair of pedals) 33 that can be powered by the rider of the bicycle sidecar. The pedals 33 are mounted on the vertical support 11. An arm 35 extends through a skin 37 of the bicycle sidecar and connects to the top sprocket 23.

Figure 5:
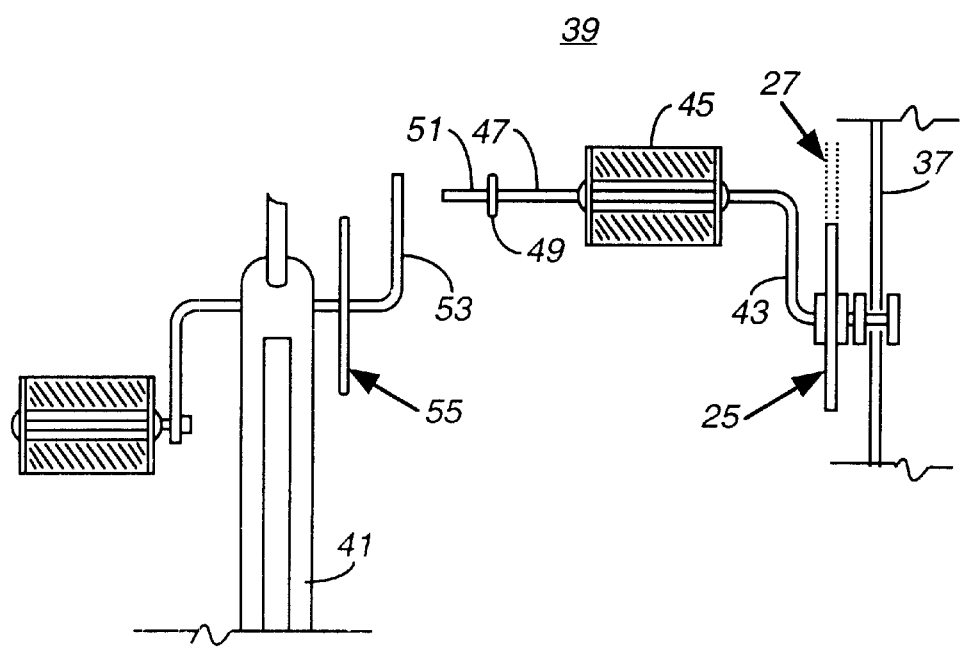
FIG. 5 is a front view of the pedal adapter assembly and it's connection to the bicycle in accordance with one embodiment of the invention.

FIG. 5 is a front view of the pedal adapter assembly 39 and it's connection to the bicycle 41 in accordance with one embodiment of the invention. The pedal adapter assembly 39 has an arm (offset arm) 43 connected to the bottom sprocket 25. The arm 43 connects to a first pedal 45. An extension 47 from the first pedal 45 has a lip 49 and a threaded tip 51. The threaded tip 51 connects to a standard pedal arm 53 of the bicycle 41. The threaded tip 51 may be connected to the standard pedal arm by a nut (washer and nut) or may screw into a threaded female portion of the standard bicycle arm 53. A bicycle sprocket 55 is connected to the standard pedal arm 53. When the bicycle sprocket 55, bottom sprocket 25 and top sprocket 23 are the same size the pedals of the bicycle and the sidecar are synchronized.

Figure 6:
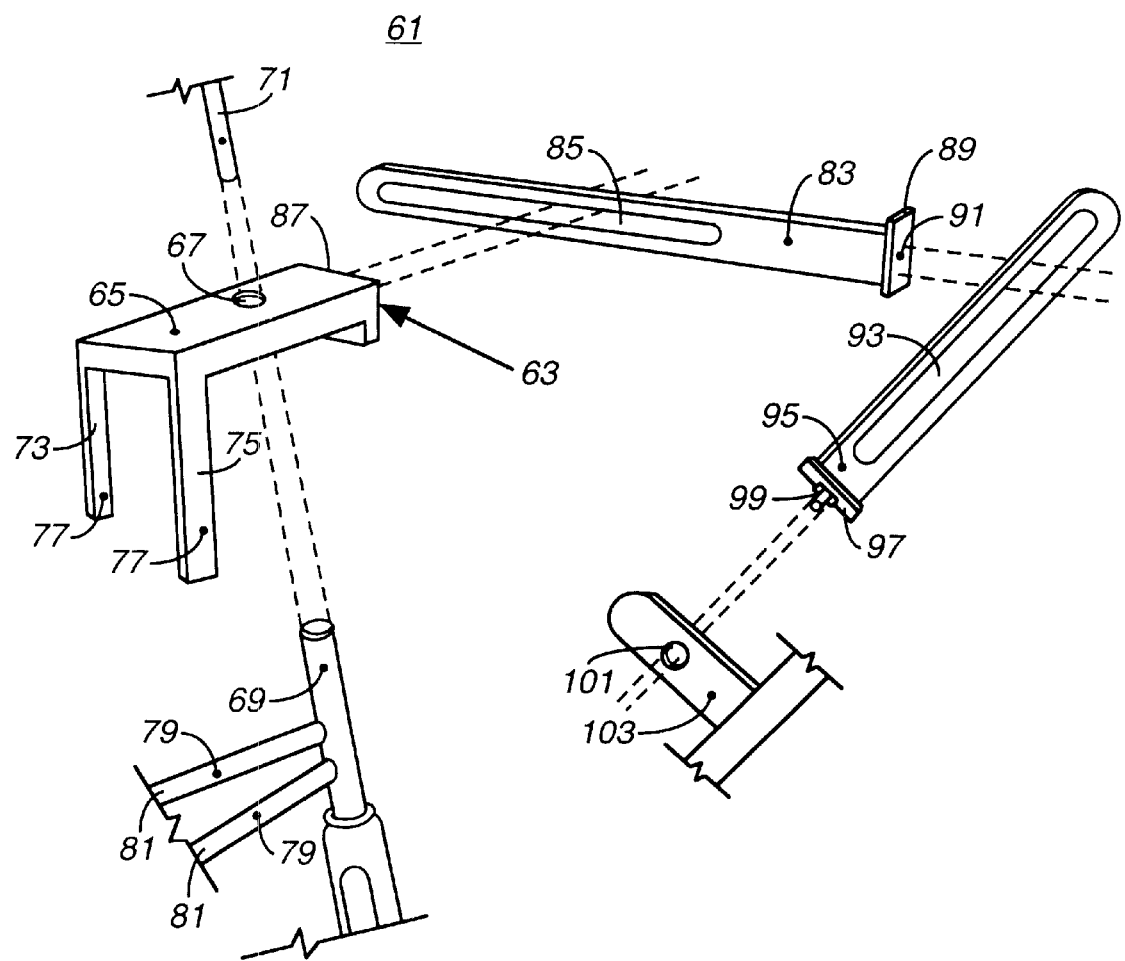
FIG. 6 is an exploded view of the connector assembly for placement at the handlebar in accordance with one embodiment of the invention.

FIG. 6 is an exploded view of the connector assembly (handlebar connector) 61 for placement at the handlebar in accordance with one embodiment of the invention. A fixed bracket 63 has a flat surface 65 with a hole 67 designed to fit over a handlebar stem 69. A portion of a handlebar 71 is shown to fit through the hole 67 and into the handlebar stem 69. The bracket 63 includes a pair of legs 73, 75 that have holes 77 designed to align with the holes 79 in the crossbars 81. The pair of legs may be attached with bolts or may be threaded or may be a more permanent attachment device. In addition, simple modifications to the legs can be made for a single crossbar bicycle design. An adjustable bracket 83 has a slot 85 that allows the adjustable bracket 83 to be adjustably attached to a front face 87 of the bracket 63. In one embodiment, the front face 87 has a stud that is threaded and extends through the slot 85 and is attached by nut. In one embodiment, the slot 85 has a series of ratchet notches and the bolt or nut has a number of matching ratchet flanges. This embodiment, provides a more secure locking in mechanism for the slot 85. The bracket 83 has an end face 89 with a second stud 91. The stud 91 extends through a slot 93 of a second adjustable bracket 95 and attaches to a nut. The second adjustable bracket 95 has a face 97 with another stud 99. The stud 99 extends through a hole 101 of a flange 103 attached to the frame of the bicycle sidecar.

Figure 7:
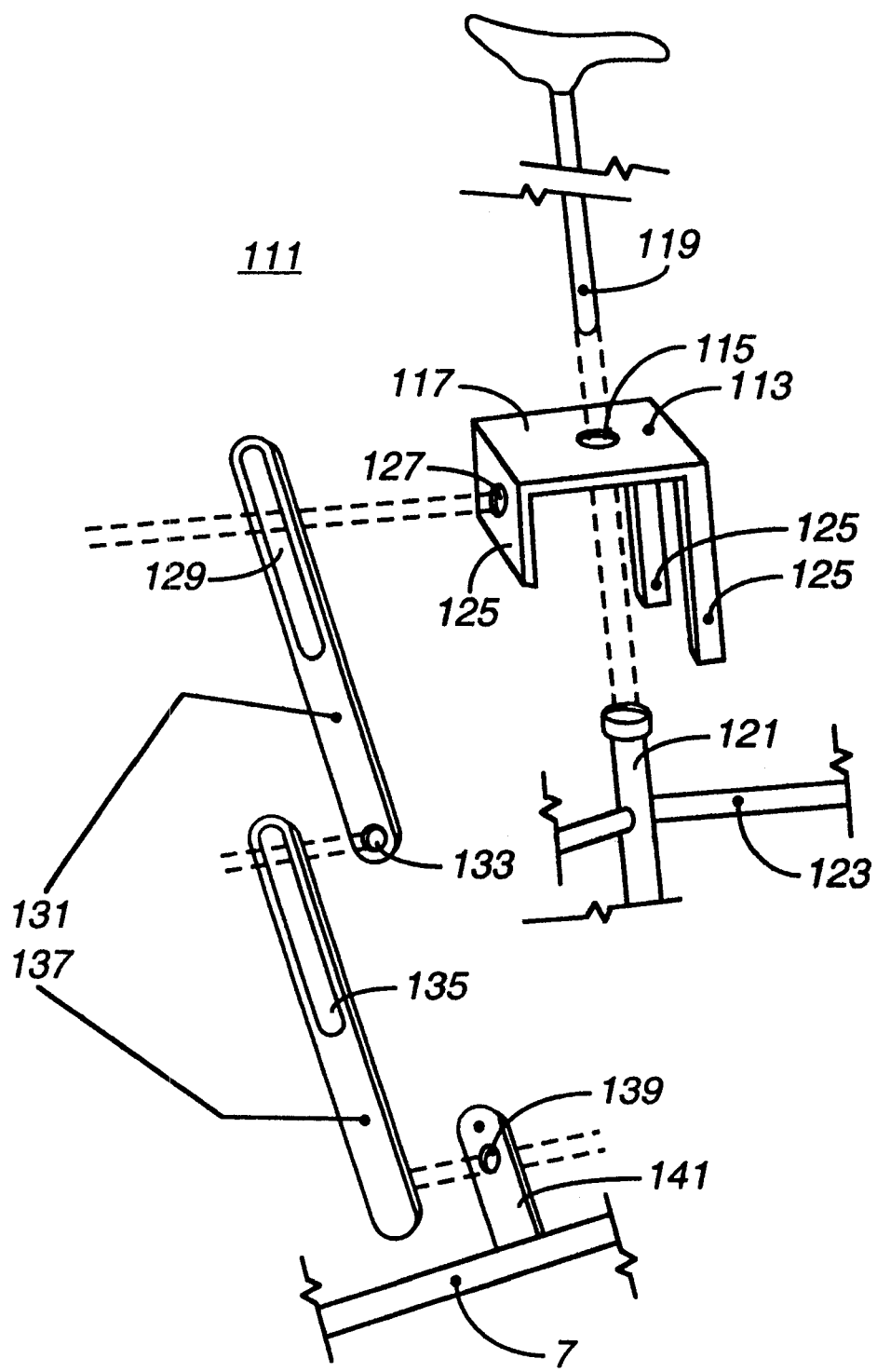
FIG. 7 is an exploded view of the connector assembly for placement at the seat in accordance with one embodiment of the invention.

FIG. 7 is an exploded view of the connector assembly (seat connector) 111 for placement at the seat in accordance with one embodiment of the invention. The connector assembly 111 has a fixed bracket 113 with a hole 115 in a top face 117 that mates with a seat stem 119. The seat stem 119 extends into a female seat stem 121 on the frame 123 of the bicycle. A pair of legs 125 extend from the top face 117 and attach to frame 123 of the bicycle in any of a number of well know manners. For instance, a nut a blot could extend through the legs and the frame or the legs may include semicircular hands that fit around a bar of the frame and have one or two blots that hold them in place. A back face 125 of the bracket 113 has an attached stud 127. The stud 127 extends through a slot 129 of bracket 131. The bracket 131 has a stud 133 that extends through a slot 135 of a second bracket 137. The second bracket 137 has a stud that extends through a hole 139 of a flange 141 of the frame 7 of the bicycle sidecar. The studs are attached in any standard method such as those discussed in FIG. 5. This system allows the attachments to be adjustable so that the bicycle sidecar may be attached to a variety of bicycles.

Figure 8:
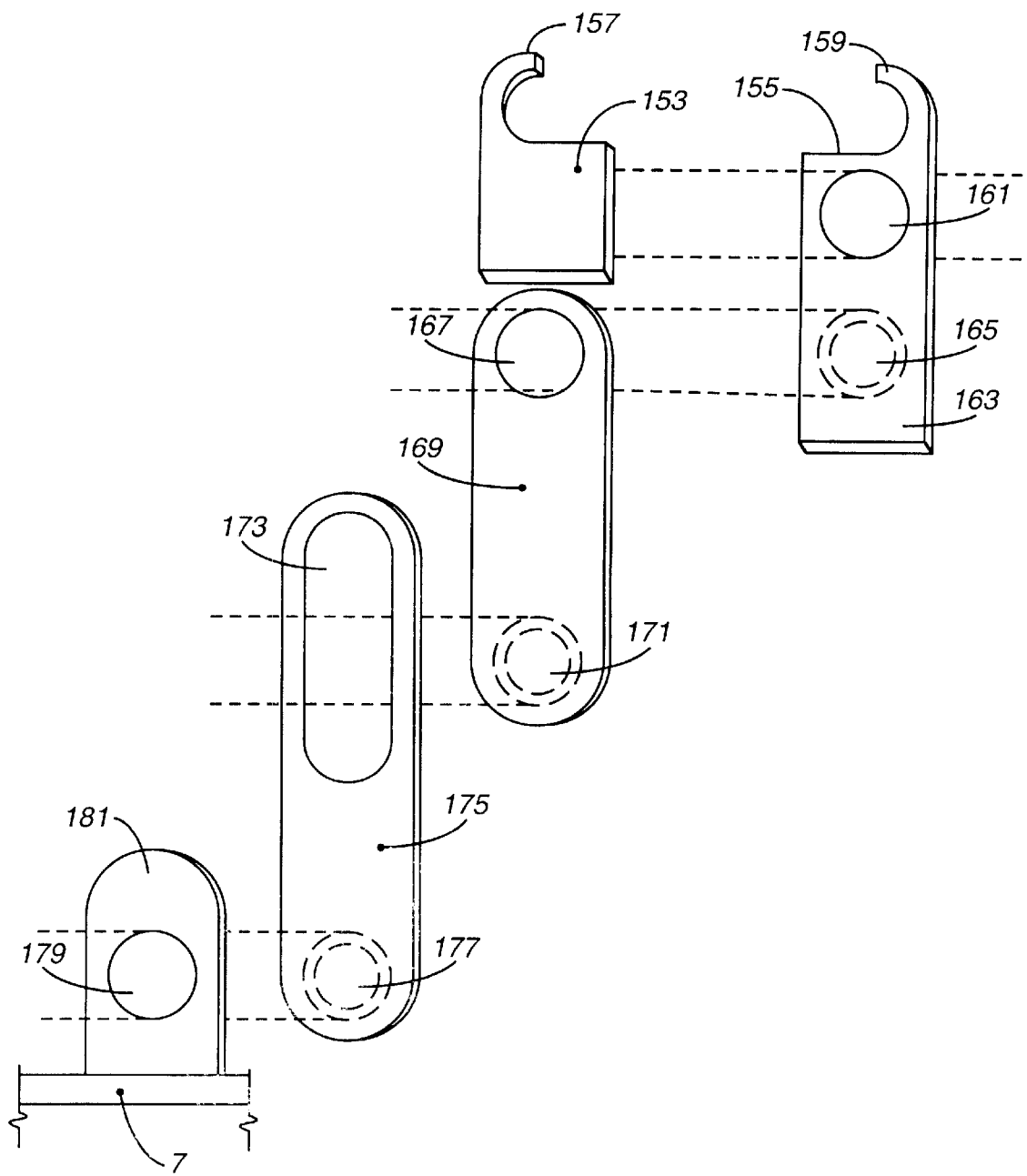
FIG. 8 is an exploded view of the connector assembly for placement at the bottom of bicycle in accordance with one embodiment of the invention.

FIG. 8 is an exploded view of the connector assembly (rear fork assembly) 151 for placement at the bottom of bicycle in accordance with one embodiment of the invention. The connector assembly 151 has a pair of arms 153, 155 with mating U shaped hands 157, 159. The U shaped hands 157, 159 are designed to fit around a tube of the frame of a bicycle. One of the pair of a arms 153 has a stud that extends through a hole 161 in the second pair of arms 155. The second arm 155 has an extension 163 with a stud 165 that extends through a hole 167 in a bracket 169. The bracket 169 has a stud 171 that extends through a slot 173 of a second bracket 175. The second bracket 175 has a stud 177 that extends through a hole 179 of a flange 181 attached to the bicycle sidecar frame 7. The studs are attached in any standard method such as those discussed in FIG. 5. This system allows the attachments to be adjustable so that the bicycle sidecar may be attached to a variety of bicycles.

In one embodiment of the sidecar a spring-cushioned seat is attached to the frame mounted in a track with a locking mechanism to allow forward and backward adjustment for comfort and pedaling effectiveness.

Thus there has been described a bicycle sidecar that allows the rider in the sidecar to assist in pedaling the bicycle. In addition, the sidecar may be attached to a variety of different bicycles.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A bicycle sidecar comprising:
   a frame;
   a protective skin covering the frame;
   a wheel connected to the frame;
   a connector system attaching the frame to a bicycle, wherein the connector system comprising a handlebar connector a seat connector and a rear fork connector;
   a seat connected to the frame;
   a grab bar connected to the frame, forward of the seat;
   a pedal assembly mounted to the frame;
   a transmission system connected to the pedal assembly; and
   a pedal adapter assembly connecting the transmission system to the bicycle.

2. The bicycle sidecar of claim 1, wherein the handlebar connector further including a fixed bracket attached to an adjustable bracket.

3. The bicycle sidecar of claim 1, wherein the pedal assembly includes a pair of pedals connected to a first sprocket.

4. The bicycle sidecar of claim 3, wherein the transmission system includes a second sprocket attached to the first sprocket.

5. The bicycle sidecar of claim 4, wherein the transmission system further including a chain connecting the first sprocket to the second sprocket.

6. The bicycle sidecar of claim 5, wherein the pedal adapter assembly is connected to the second sprocket.

* * * * *